United States Patent [19]

Garvey et al.

[11] Patent Number: 4,814,389
[45] Date of Patent: Mar. 21, 1989

[54] DRILLING FLUID DISPERSANT

[75] Inventors: Christopher M. Garvey, Princeton; Arpad Savoly, Martinsville, both of N.J.; Thomas M. Weatherford, Houston, Tex.

[73] Assignee: Diamond Shamrock Chemicals Company, Painesville, Ohio

[21] Appl. No.: 71,203

[22] Filed: Jul. 8, 1987

Related U.S. Application Data

[62] Division of Ser. No. 826,583, Feb. 6, 1986, Pat. No. 4,711,731.

[51] Int. Cl.$^4$ .............................. C08F 8/42
[52] U.S. Cl. ...................... 525/329.9; 525/330.2; 525/366; 525/367; 525/368; 525/369; 525/380
[58] Field of Search ..................... 525/330.2, 329.9

[56] References Cited

U.S. PATENT DOCUMENTS

| | | | |
|---|---|---|---|
| 2,552,775 | 5/1951 | Fischer et al. | 252/8.5 |
| 2,603,598 | 7/1952 | Meadors | 252/8.5 |
| 2,718,497 | 9/1955 | Oldham et al. | 252/8.5 |
| 4,370,171 | 1/1983 | Robinson et al. | 106/300 |
| 4,507,422 | 3/1985 | Farrar et al. | 524/425 |
| 4,554,307 | 11/1985 | Farrar et al. | 524/425 |

FOREIGN PATENT DOCUMENTS 60-133085  7/1985  Japan.

OTHER PUBLICATIONS

U. D. Mamadzhanov et al in Tr. VNII Ekon., Organiz. Proiz-Va Tekhn.-Ekon. Inform. V Gaz. Prom-Sti (1974), pp. 114–117.

*Primary Examiner*—Joseph L. Schofer
*Assistant Examiner*—Bernard Lipman
*Attorney, Agent, or Firm*—Neal T. Levin; Ernest G. Szoke; Wayne C. Jaeschke

[57] ABSTRACT

An aqueous drilling fluid having present in an amount sufficient to disperse the fluid and to provide resistance to high temperatures and solids contamination of the drilling fluid, at least one salt of a polymer or copolymer of acrylic or methacrylic acid with alkanolamine, alkylamine, mixtures of alkanolamine and alkylamine, mixtures of lithium and alkanolamine, mixtures of lithium and alkylamine and mixtures of lithium, alkanolamine and alkylamine, the polymer having a weight average molecular weight of between about 2,000 and about 15,000 and a pH of from about 6 to about 8.5 and where mixtures of lithium and alkanolamine, lithium and alkylamine or mixtures of lithium, alkanolamine and alkylamine are used, the amount of lithium is present to give from about 30% to about 70% of the desired neutralization of the polymer and the alkanolamine and/or alkylamine is present to give from about 70% to about 30% of the desired neutralization of the polymer.

2 Claims, No Drawings

DRILLING FLUID DISPERSANT

This application is a division, of application Ser. No. 826,583, filed Feb. 6, 1986 now U.S. Pat. No. 4,711,731.

BACKGROUND OF THE INVENTION

1. Field of the Invention

This invention relates to a drilling fluid dispersant having improved temperature stability, dispersing properties and "solids contamination" tolerance.

2. Description of the Prior Art

U.S. Pat. No. 2,552,775—Fischer et al, issued May 15, 1951, describes a water based clay drilling fluid containing an alkali metal or ammonium polyacrylate salt having a molecular weight greater than 2,000 as a protective agent for controlling filtration rates, viscosities and other properties as well as preserving and/or increasing producing formation permeabilities.

U.S. Pat. No. 2,603,598—Meadors, issued July 15, 1952, describes a water based clay drilling fluid containing sufficient alkanolamine to increase pH to at least 10 without unduly increasing viscosity.

U.S. Pat. No. 2,718,497—Oldham et al, issued Sept. 20, 1955, describes a water based clay drilling fluid containing a linear hydrocarbon chain polymer acid salt such as a polyacrylic acid salt having a molecular weight greater than 10,000 to control water loss. The salt is produced by reacting alkali metal hydroxide, ammonium hydroxide or an alkanolamine with the acid.

U.S. Pat. No. 4,370,171—Robinson et al, issued Jan. 25, 1983, describes a method for dispersing a comminuted solid in aqueous medium using a salt of alkanolamine and polymeric carboxylic acid. Polymeric carboxylic acids such as polyacrylic acids may be used.

U. D. Mamadzhanov et al in Tr. VNII Ekon., Organiz. Proiz-Va I Tekhn.-Ekon. Inform. V Gaz. Prom-Sti (1974) 114–117 describe synthesis of chemical reagents based on acrylic polymers and aminoalcohols. A study of these reagents on clayey solutions has shown that they may find practical application in deep well drilling.

Japanese Patent Public Disclosure No. 60-133085—Nippon Oils and Fats KK published July 16, 1985 describes a mud additive to improve heat, salt and cement resistance of a water based clay drilling fluid. The additive may be (a) polyacrylic acid having a 1000–20,000 molecular weight or (b) an alkali metal, ammonium or alkanolamine salt of (a) having a degree of neutralization of 30% or less.

SUMMARY OF THE INVENTION

High temperature stability, dispersing properties and tolerance to "solids contamination" of a water based clay drilling fluid are improved by addition of sufficient low molecular weight salts of polyacrylic acid, polymethacrylic acid or copolymers thereof with alkanolamine, alkylamine, mixtures of alkanolamine and alkylamine and with mixtures of lithium and alkanolamine, mixture of lithium and alkylamine and mixtures of lithium, alkanolamine and alkylamine having a pH from about 6.0 to about 8.5 as a dispersant. The pH is indicative of the degree of neutralization of the polymer. Copolymers containing at least 50% acrylic acid or methacrylic acid may also be used. Molecular weight of the polyacrylic acid, polymethacrylic acid or copolymer acid may be from about 2000 to about 15,000. From about 0.1 to about 5.0 ppb (pounds per barrel) of one of the above salts may be added to the drilling fluid.

DETAILED DESCRIPTION

In drilling an oil, gas, thermal or water well with rotary drilling tools, hollow drill pipe with a rotary bit attached to the lower end is used. The drill pipe with attached bit is rotated in the borehole. A drilling mud or fluid is pumped down the hollow drill pipe and through the bit at the bottom of the borehole and then up to the surface through the annular space between the drill pipe and the borehole wall. The drilling fluid is a suspension of solid material in a liquid medium such as water. It may contain other additives. The drilling fluid lubricates and cools the drill bit, suspends and carries cuttings out of the borehole, coats the wall of the hole with a thin impervious layer of solid material to prevent flow of fluids into or out of the formation and exerts a hydrostatic pressure to the formation to counterbalance the pressure of liquids or gases present therein.

For a drilling fluid to perform its functions, it must have certain desirable physical properties. The fluid must have a viscosity that is readily pumpable without undue pressure differentials. It must be sufficiently thixotropic to suspend the cuttings in the borehole when fluid circulation stops. The fluid must release cuttings from the suspension when agitated in the settling pits. It must form a thin impervious filter cake on the borehole wall to prevent loss of liquid from the drilling fluid by filtration into the formations. Such a filter cake effectively seals the borehole wall to inhibit any tendencies of sloughing, heaving or cave-in of rock into the borehole. Further, the fluid must be capable of suspending high specific gravity weighting agents such as inorganic heavy metal compounds to maintain a pressure substantially greater than the hydrostatic pressure of a column of water of equal depth against a formation when necessary. The composition of the fluid should also be such that cuttings formed during drilling the borehole and can be assimilated or dissolved in the fluid without affecting physical properties of the drilling fluid.

An other important characteristic of a drilling mud is that their viscosities should be such that they are readily and easily circulated by pumping at those pressures ordinarily employed in drilling operations.

Previous drilling fluids include clay slurries such as water-based bentonite clay slurries which are used as drilling fluids. To disperse the solid materials in these fluids, a dispersant such as ferrochrome lignosulfonate (FCLS) is required. However, when FCLS containing slurries are used at extremely high temperatures, FCLS breaks down and the drilling fluid gels.

Another dispersant system, which is also used with drilling fluids, is a combination of FCLS and a sulfonated polystyrene maleic anhydride copolymer. This system requires two components, maintenance of the FCLS, and is more expensive.

Still another dispersant system, which is used with drilling fluids is polyacrylic acids having molecular weights less than 8,000. These dispersants are very effective at low concentrations but are sensitive to drilled solid contamination which renders them less effective at high temperatures and reduces their dispersing properties.

The present invention provides water based drilling fluid dispersants which remain operable at temperatures as high as 400° F. and has significantly greater solids tolerance. It provides a drilling fluid with a dispersant which is operable at high temperatures and high solids.

When employing a water-based clay drilling fluid with this dispersant which remains stable at this higher temperature, it is possible to drill into deep formations where temperatures are above 350° F.

By neutralization of a polyacrylic or polymethacrylic acid or copolymers thereof with alkanolamine, alkylamine, mixtures of alkanolamine and alkylamine, mixtures of lithium and alkanolamine, mixtures of lithium and alkylamine or mixtures of lithium, alkanolamine and alkylamine a solids tolerant and high temperature stable dispersant as well as a stable drilling fluid, is obtained.

For example, the polyacrylic acid, polymethacrylic acid or copolymer thereof is neutralized to a pH from about 6 to about 8.5 with one or more alkanolamine having from 2 to 12 carbon atoms such as monoethanolamine, diethanolamine, triethanolamine, propanolamine, isopropanolamine, diisopropanolamine, triisopropanolamine, butanolamine, dimethyl ethanolamine, diethylethanolamine or the like as well as their isomers and homologs and/or one or more alkylamines having from 2 to 12 carbon atoms such as monoethylamine, diethylamine, triethylamine, propylamine, butylamine, hexylamine, dodecylamine as well as their isomers and homologs. Where alkanolamines and/or alkylamines are used with lithium, e.g., as lithium hydroxide, neutralization is accomplished by using the neutralizing agents sequentially or as a mixture. These procedures are well known and need not be described in detail here. Further, where the aforesaid alkanolamine and/or alkylamine are used with, e.g., lithium hydroxide, the polyacrylic acid, polymethacrylic acid or copolymer thereof is likewise neutralized to a pH from about 6 to about 8.5. In such instance, the lithium, e.g., lithium hydroxide, is used to give from about 30% to about 70% of the desired neutralization of the polymer while the alkanolamine and/or the alkylamine is used to give from about 70% to about 30% of the desired neutralization of the polymer.

The salt of polyacrylic acid or polymethacrylic acid or copolymer may be added to the drilling fluid in anhydrous, solution, suspension or emulsion form.

Useful copolymers such as copolymers prepared from acrylic acid or methacrylic acid with comonomers such as maleic anhydride, acrylamide, 2-acrylamido-2-methyl propane sulfonic acid, styrene sulfonic acid and vinyl sulfonic acid or the like, may be used. These copolymers should contain at least 50% by weight of acrylic acid or methacrylic acid. The copolymers are neutralized to a pH of from about 6 to about 8.5 with one of the above basic materials.

PROCEDURE

The terms K and n are used in rheological Power Law Models. These terms are calculated from 600 RPM and 300 RPM Dial Readings taken with the direct indicating viscometer using the following formulas:

$$n = 3.32 \times \log_{10} \frac{600 \text{ RPM Dial Reading}}{300 \text{ RPM Dial Reading}}$$

$$K = \frac{(300 \text{ RPM Reading}) \times 1.066}{100 \times (511)^n}$$

The constant K is the value of the shear stress at a shear rate of 1 $sec^{-1}$. It is measured by extrapolating the straight line of the log of the shear stress versus the log of the shear rate between 10 to 100 $sec^{-1}$ back to a value of $sec^{-1}$. The exponent n is determined by measuring the slope of the curve when plotting the log of the shear stress versus the log of the shear rate between 10 and 100 $sec^{-1}$. The constant K is the consistency index, expressed in lb-$sec^n$/sq. ft. while n is a dimensionless flow behavior index.

The plastic viscosity, PV, is a measure of the internal resistance to fluid flow attributable to the amount, type, and size of solids present in a given fluid. The value, expressed in centipoises, is proportional to the slope of the consistency curve determined in the region of laminar flow for materials obeying Bingham's Law of Plastic Flow. When using the direct indicating viscometer, the plastic viscosity is found by subtracting the 300 rpm reading corresponding to a shear rear of 511 $sec^{-1}$ from the 600 rpm reading corresponding to a shear rate of 1021 $sec^{-1}$.

The yield point, YP, also known as the yield value is the resistance to initial flow, or represents the stress required to start fluid movement. This resistance is believed to be due to electrical charges located on or near the surfaces of the particles. Values of yield point and thixotropy, respectively, are measurements of the same fluid properties under dynamic and static states. Bingham yield values reported in lb./100 sq. ft., are determined by using the direct-indicating viscometer and subtracting the plastic viscosity from the 300 rpm reading.

The gel strength is the ability or measure of the ability of a colloid to form gels as a function of time or thixotropy. It is believed to be a measure of the same interparticle forces of a fluid as determined by the yield point except that gel strength is measured under static conditions, yield point under dynamic conditions. The 10 sec. gel strength measurements are initial and the 10 minute are later measurements. The measured initial gel strength of a fluid is the maximum reading (deflection) taken from a direct reading viscometer after the fluid has been static for 10 seconds. This test procedure is described in API RP 13B. The 10 minute gel strength of a fluid is the maximum reading (deflection) taken with a direct reading viscometer after the fluid has been quiescent for 10 minutes. Gel strength is a pressure unit measurement reported in lb./100 sq. ft.

The Fann viscometer (Model 35-A) Meter is a direct reading viscometer, having an outer cylinder which can be rotated at 600, 300, 200, 100, 6 and 3 revolutions per minute (rpm). An inner, concentric cylinder is connected to a scale to permit the operator to read same. The reading at 600 rpm and 300 rpm are recorded. From these readings, plastic viscosity and yield point can be calculated.

The yield point is the parameter of particular interest to this invention. Generally, a lower yield point value indicated that the dispersant is effective in the particular drilling fluid being tested.

EVALUATION OF POLYMERS AS MUD DISPERSANT

The following procedures may be utilized to evaluate salts of polymers as dispersants in fresh water and seawater dispersant mud formulations.

PREPARATION OF TEST SAMPLES

A 350 ml sample of dispersant mud formulation is placed in a stainless steel beaker. With thorough mixing, the polymer is added slowly to the mud and mixed for an additional 15-20 minutes. Mud pH is monitored during mixing and adjusted if necessary. After mixing, viscosities and gel strength of the mud are measured using a Fann viscometer (Model 35-A).

AGING TEST

Equipment:
Aging cell, Model #76017 obtained from NL Baroid, Texas. Roller or forced air oven.
Procedure:
(a) Mud containing polymer is placed in aging cell.
(b) The contents of the cell are pressurized with nitrogen gas.
(c) The cell is then placed in a roller oven pre-heated to the desired heat aging temperature (dynamic heat aging) or a forced air oven (static heat aging) for 16 hours. All testing is dynamic heat aging unless indicated otherwise.
(d) At the end of the heat aging period, the aging cell is removed from the oven, cooled under cold running water, pressure released and the aged mud transferred into a stainless steel beaker.
(e) Mud pH is checked and if necessary, adjusted to between 9.0 to 10.0 after hot rolling. Rheology measurements are made with Fann viscometer (Model 35-A).
(f) After hot rolling data is gathered, muds are remixed and placed in the cells and statically aged for 16 hours at the desired temperature.
(g) At the end of the heat aging period, the aging cell is removed from the oven, cooled under cold running water, pressure released and the aged mud transferred into a stainless steel beaker.
(h) Rheology and fluid loss measurements are made using API procedure and equipment.

MUD RHEOLOGY

Plastic viscosity (PV), yield point (YP) and gel strengths at 10 second and 10 minute intervals are measured using API procedure RP13B.

MOLECULAR WEIGHTS

Molecular weights of polymers are determined by gel permeation chromatography using polystyrene sulfonic acid as the standard.

For a fuller understanding of the nature and advantages of this invention, reference may be made to the following examples. These examples are given merely to illustrate the invention and are not to be construed in a limiting sense. All quantities, proportions and percentages are by weight and all references to temperature are °F. unless otherwise indicated.

In the examples all references to pounds per barrel of drilling fluid are to a 42 gallon barrel of the drilling fluid and shown as ppb. References to pounds per gallon of drilling fluid are shown as ppg.

EXAMPLE I

This example demonstrates use of mono, di- and tri-alkanol salts of polyacrylic acid as dispersants in fresh water drilling fluids. Monoethanolamine, diethanolamine and triethanolamine salts of polyacrylic acid having a weight average molecular weight of about 5,000 were prepared by neutralizing the acid with each amine. Aqueous solutions of these salts were then added as dispersants to Drilling Fluid Samples I and II.

Drilling Fluid Sample I was a 12 ppg (pound per gallon) fresh water mud having the following compositions:
300 g of prehydrated gel slurry (22.5 ppb Wyoming bentonite)
1 g of aqueous solution of dispersant (by activity)
pH 9-10 of 25% by weight NaOH solution
200 g of barite.

Drilling Mud Sample I was initial sample and Drilling Mud Sample II contained 30 g of calcium bentonite as solids contamination. Drilling Mud Sample II HR was obtained after Sample II was hot rolled at 150° F. for 16 hours.

Results obtained with these samples are given in Table I.

Laboratory prepared muds of fresh water, 12 ppg and seawater, 12 ppg were prepared and tested initially, after hot rolling at 150° F. for 16 hours and after static aging at 400° F. for 16 hours. Muds with the preferred dispersants were also tested under dynamic temperature and pressure by the use of the Fann viscometer (Model 50C).

Compositions of mud formulations are given below:

DISPERSANT MUD FORMULATIONS

Formulations were prepared using the order of addition shown below:
A. Fresh Water, 12 ppg Mud
1. Prehydrated gel slurry (22.5 ppg Wyoming Bentonite): 300 g
2. Dispersant: X
3. NaOH, 25% solution: 9-10 pH
4. Barite: 200 g
   Mix 10 minutes
5. Calcium bentonite (for solids contamination): 15 g
B. Seawater, 12 ppg Mud
1. Prehydrated gel slurry: 300 g
2. Sea salt: 14.7 g
   Mix 2 minutes
3. Dispersant: X
4. NaOH, 25% solution: 9-10 pH
5. Barite: 200 g
   Mix 10 minutes
6. Calcium bentonite (for solids contamination): 15 g
   Mix 5 minutes The following sets forth the abbreviations for the dispersants present in the examples and where appropriate additional information.
MEA-AA: Monoethanolamine salt of polyacrylic acid having a weight average molecular weight of 5,000 and a pH of 7.8 to 8.0.
DEA-AA: Diethanolamine salt of polyacrylic acid having a weight average molecular weight of 5,000 and a pH of 7.8 to 8.0.
TEA-AA: Triethanolamine salt of polyacrylic acid having a weight average molecular weight of 5,000 and a pH of 7.8 to 8.0.
TEA-Li-AA: Mixed lithium and triethanolamine salt of polyacrylic acid having a weight average molecular weight of 5,000 and a pH of 7.8 to 8.0. Neutralization was complete, i.e., 100% contributed as follows: Neutralization by triethanolamine=54%. Neutralization by lithium hydroxide=46%. In this instance, the polymer salt was prepared by partially neutralizing the polyacrylic acid first with triethanolamine to 54% neutralization. Neutralization was then completed by addition of lithium hydroxide.

TIPA-AA: Triisopropanolamine salt of polyacrylic acid having a weight average molecular weight of 5,000 and a pH of 7.8 to 8.0.

Li-AA: Lithium salt of polyacrylic acid having a weight average molecular weight of 5,000 and a pH of 7.8 to 8.5.

AMP-AA: Amino methyl propanolamine salt of polyacrylic acid acid having a weight average molecular weight of 5,000 and a pH of 7.8 to 8.5.

Na-AA: Sodium salt of polyacrylic acid having a weight average molecular weight of 5,000 and a pH of 7.8 to 8.5.

TEA-AA: Triethanolamine salt of polyacrylic acid having a weight average molecular weight of 5,000 and a pH of 4.3 (16% neutralized).

AA-MA: Acrylic acid maleic anhydride copolymer of molecular weight 5000 and pH=7 to 8 (ratios of monomers shown in Table IX).

Na-AMD-AMPS: Sodium salt of acrylamide (80% by wt.), 2-acrylamido-2-methylpropane sulfonic acid (20% by wt.) copolymer of molecular weight=6500 and pH=6.8.

TABLE I

Alkanolamine Salts of Polyacrylic Acid as Fresh Water Mud Dispersants

| Drilling Fluid Sample* | MEA—AA | | | DEA—AA | | | TEA—AA | | |
|---|---|---|---|---|---|---|---|---|---|
| | I | II | IIHR | I | II | IIHR | I | II | IIHR |
| Fann 35 viscosity readings at | | | | | | | | | |
| 600 rpm | 83 | 218 | 300+ | 75 | 203 | 290 | 60 | 127 | 190 |
| 300 rpm | 46 | 139 | 220 | 42 | 128 | 195 | 33 | 78 | 120 |
| 200 rpm | 33 | 107 | 175 | 30 | 98 | 155 | 24 | 57 | 93 |
| 100 rpm | 19 | 66 | 117 | 17 | 60 | 102 | 13 | 34 | 57 |
| 6 rpm | 2 | 8 | 20 | 1 | 7 | 18 | 1 | 4 | 7 |
| 3 rpm | 1 | 5 | 12 | 1 | 4 | 10 | 1 | 3 | 5 |
| Plastic viscosity, cps | 37 | 79 | — | 33 | 75 | 95 | 27 | 49 | 70 |
| Yield point, lb/100 sq. ft. | 9 | 60 | — | 9 | 53 | 100 | 6 | 29 | 50 |
| 10 second gel | 2 | 5 | 13 | 1 | 4 | 11 | 2 | 3 | 5 |
| 10 minute gel | 2 | 7 | 15 | 1 | 6 | 11 | 1 | 3 | 7 |

*pH adjusted to 9.5–10.5.

This table shows the effectiveness of triethanolamine salt over that of di and monoethanolamine salts.

TABLE II 1 ppb (by activity) Dispersant in 12 ppg Fresh Water Mud Containing Calcium Bentonite as Solid Contaminant, Initial Test Data, pH Adjusted to about 10.0

| Dispersant | Fann 35 Viscosity Reading at RPM | | | | | | Gel Strength | | Bingham Plastic | | Power Law | |
|---|---|---|---|---|---|---|---|---|---|---|---|---|
| | 600 | 300 | 200 | 100 | 6 | 3 | 10 Sec | 10 Min | PV | YP | n | K |
| TEA—AA | 76 | 42 | 30 | 17 | 2 | 1 | 2 | 2 | 34 | 8 | 0.86 | 0.0022 |
| TEA—Li—AA | 72 | 40 | 27 | 16 | 2 | 1 | 1 | 1 | 32 | 8 | 0.85 | 0.0022 |
| Na—AA | 108 | 59 | 43 | 24 | 2 | 1 | 2 | 2 | 49 | 10 | 0.87 | 0.0027 |
| TIPA—AA | 84 | 48 | 35 | 19 | 2 | 1 | 2 | 2 | 36 | 12 | 0.81 | 0.0033 |
| Li—AA | 119 | 68 | 50 | 28 | 2 | 1 | 2 | 2 | 51 | 17 | 0.81 | 0.0047 |
| AMP—AA | 113 | 67 | 48 | 28 | 3 | 2 | 1 | 2 | 46 | 21 | 0.75 | 0.0065 |
| TEA—AA (16% neutralized) | 128 | 77 | 57 | 34 | 5 | 3 | 5 | 7 | 51 | 26 | 0.73 | 0.0085 |

TABLE III 1 ppb (by activity) Dispersant in 12 ppg Fresh Water Mud Containing Calcium Bentonite as Solid Contaminant, Hot Rolled at 150° F. for 16 Hours, pH Adjusted to about 10.0

| Dispersant | Fann 35 Viscosity Reading at RPM | | | | | | Gel Strength | | Bingham Plastic | | Power Law | |
|---|---|---|---|---|---|---|---|---|---|---|---|---|
| | 300 | 200 | 200 | 100 | 6 | 3 | 10 Sec | 10 Min | PV | YP | n | K |
| TEA—Li—AA | 113 | 66 | 48 | 27 | 2 | 1 | 2 | 2 | 47 | 19 | 0.78 | 0.0056 |
| TEA—AA | 122 | 72 | 53 | 31 | 4 | 2 | 3 | 3 | 50 | 22 | 0.76 | 0.0067 |
| TIPA—AA | 147 | 90 | 67 | 40 | 5 | 3 | 3 | 3 | 57 | 33 | 0.71 | 0.0116 |
| Na—AA | 179 | 109 | 80 | 48 | 6 | 4 | 6 | 6 | 70 | 39 | 0.72 | 0.0134 |
| TEA—AA partial | 181 | 115 | 87 | 54 | 8 | 6 | 7 | 9 | 66 | 49 | 0.65 | 0.0208 |
| AMP—AA | 196 | 125 | 95 | 59 | 9 | 5 | 5 | 6 | 71 | 54 | 0.65 | 0.0233 |
| Li—AA | 209 | 132 | 99 | 61 | 8 | 5 | 5 | 6 | 77 | 55 | 0.66 | 0.0226 |

TABLE IV 1 ppb (by activity) Dispersant in 12 ppg Fresh Water Mud Containing Calcium Bentonite as Solid Contaminant, Hot Rolled at 150° F. for 16 Hours and Then Static Aged at 400° F. for 16 Hours

| Dispersant | Fann 35 Viscosity Reading at RPM | | | | | | Gel Strength | | Bingham Plastic | | pH | Shear | Power Law | |
|---|---|---|---|---|---|---|---|---|---|---|---|---|---|---|
| | 600 | 300 | 200 | 100 | 6 | 3 | 10 Sec | 10 Min | PV | YP | | | n | K |
| TEA—AA | 118 | 70 | 51 | 31 | 3 | 2 | 2 | 2 | 48 | 22 | 9.1 | 85 | 0.75 | 0.0068 |
| Li—TEA—AA | 136 | 83 | 62 | 37 | 4 | 2 | 3 | 3 | 53 | 30 | 9.2 | 45 | 0.71 | 0.0104 |
| TIPA—AA | 193 | 127 | 96 | 60 | 8 | 5 | 5 | 5 | 66 | 61 | 9.4 | 80 | 0.60 | 0.0314 |
| Na—AA | * | 211 | 168 | 113 | 17 | 11 | 12 | 12 | * | * | 9.2 | 320 | ** | ** |
| Li—AA | * | 254 | 207 | 144 | 29 | 19 | 19 | 20 | * | * | 8.5 | 140 | ** | ** |
| TEA—AA (16% neutralized) | * | * | * | * | * | * | * | * | * | * | * | * | ** | ** |
| AMP—AA | * | * | * | * | * | * | * | * | * | * | * | * | ** | ** |

*Too thick to measure
**Too thick to calculate

This series of Tables II–IV dramatically illustrates the superior dispersing effects of the invention. Using YP (yield point) as a guide, in all cases the invention exhibited lower, therefore better dispersing properties. Also the importance of the degree of neutralization is evident by comparing data of the partially neutralized salt (TEA-AA 16% neutralized, pH 4.3) with TEA-AA (8.0 pH). After static aging, the partially neutralized salt was too thick to measure.

TABLE V 1 ppb (by activity) Dispersant in 12 ppg Sea Water Mud Containing Calcium Bentonite as Solid Contaminant, Initial Test Data, pH Adjusted to about 10.0 pH

| Dispersant | Fann 35 Viscosity Reading at RPM | | | | | | Gel Strength | | Bingham Plastic | | Power Law | |
|---|---|---|---|---|---|---|---|---|---|---|---|---|
| | 600 | 300 | 200 | 100 | 6 | 3 | 10 Sec | 10 Min | PV | YP | n | K |
| TEA—Li—AA | 35 | 22 | 17 | 12 | 7 | 7 | 11 | 33 | 13 | 9 | 0.67 | 0.0036 |
| AMP—AA | 41 | 27 | 22 | 17 | 11 | 11 | 16 | 31 | 14 | 13 | 0.60 | 0.0067 |
| Li—AA | 40 | 27 | 21 | 16 | 9 | 8 | 14 | 38 | 13 | 14 | 0.57 | 0.0084 |
| TIPA—AA | 44 | 30 | 25 | 20 | 14 | 14 | 16 | 19 | 14 | 16 | 0.55 | 0.0102 |
| Na—AA | 44 | 30 | 24 | 18 | 9 | 9 | 17 | 38 | 14 | 16 | 0.55 | 0.0102 |
| TEA—AA | 56 | 41 | 36 | 29 | 19 | 19 | 19 | 24 | 15 | 26 | 0.45 | 0.0265 |

TABLE VI 1 ppb (by activity) Dispersant in 12 ppg Sea Water Mud Containing Calcium Bentonite as Solid Contaminant, Hot Rolled at 150° F. for 16 Hours, pH Adjusted to 10.0

| Dispersant | Fann 35 Viscosity Reading at RPM | | | | | | Gel Strength | | Bingham Plastic | | Power Law | |
|---|---|---|---|---|---|---|---|---|---|---|---|---|
| | 600 | 300 | 200 | 100 | 6 | 3 | 10 Sec | 10 Min | PV | YP | n | K |
| TEA—Li—AA | 46 | 32 | 27 | 20 | 13 | 11 | 15 | 30 | 14 | 18 | 0.52 | 0.0131 |
| TIPA—AA | 51 | 37 | 32 | 26 | 17 | 16 | 18 | 21 | 14 | 23 | 0.46 | 0.0220 |
| Li—AA | 53 | 39 | 32 | 25 | 15 | 14 | 17 | 33 | 14 | 25 | 0.44 | 0.0264 |
| Na—AA | 63 | 47 | 40 | 33 | 21 | 19 | 21 | 33 | 16 | 31 | 0.42 | 0.0359 |
| AMP—AA | 61 | 47 | 41 | 34 | 23 | 22 | 24 | 25 | 14 | 33 | 0.38 | 0.0480 |
| TEA—AA | 68 | 51 | 44 | 36 | 24 | 23 | 23 | 27 | 17 | 34 | 0.41 | 0.0409 |

TABLE VII 1 ppb (by activity) Dispersant in 12 ppg Sea Water Mud Containing Calcium Bentonite as Solid Contaminant, Hot Rolled at 150° C. for 16 Hours and Then Static Aged at 400° F. for 16 Hours

| Dispersant | Fann 35 Viscosity Reading at RPM | | | | | | Gel Strength | | Bingham Plastic | | pH | Shear | Power Law | |
|---|---|---|---|---|---|---|---|---|---|---|---|---|---|---|
| | 600 | 300 | 200 | 100 | 6 | 3 | 10 Sec | 10 Min | PV | YP | | | n | K |
| TEA—Li—AA | 84 | 75 | 72 | 66 | 54 | 51 | 42 | 44 | 9 | 66 | 7.6 | 45 | 0.16 | 0.2886 |
| Li—AA | 110 | 94 | 87 | 78 | 58 | 57 | 46 | 54 | 16 | 78 | 7.1 | 45 | 0.23 | 0.2438 |
| TEA—AA | 97 | 89 | 83 | 77 | 61 | 56 | 45 | 45 | 8 | 81 | 7.7 | 70 | 0.12 | 0.4375 |
| Na—AA | 109 | 97 | 91 | 82 | 64 | 61 | 50 | 60 | 12 | 85 | 7.5 | 85 | 0.17 | 0.3623 |
| TIPA—AA | 118 | 104 | 98 | 94 | 77 | 64 | 53 | 56 | 14 | 90 | 7.7 | 120 | 0.18 | 0.3561 |
| AMP—AA | 154 | 134 | 127 | 122 | 102 | 93 | 81 | 83 | 20 | 114 | 8.0 | 120 | 0.20 | 0.4089 |

Tables V–VII show data indicating that the mixed lithium-triethanolamine salt (Li-TEA) of acrylic acid is a superior dispersant over other similar polyacrylate dispersants in seawater drilling fluids.

TABLE VIII

Dynamic Temperature and Pressure Testing of 12 ppg Fresh Water Mud Without Calcium Bentonite Using Fann 50-C Setting of 100 RPM 500 psi

| Dispersant | ppb by activity | Viscosity (cps) | | | | | | |
|---|---|---|---|---|---|---|---|---|
| | | 100° F. | 150° F. | 200° F. | 250° F. | 300° F. | 350° F. | 400° F. |
| 1 Na—AA—AMD | 1 | 100 | 50 | 25 | 20 | 10 | 110 | 900 |
| 2 TEA—AA | 1 | 40 | 10 | 10 | 10 | 10 | 10 | 10 |
| 3 Li + TEA—AA | 1 | 40 | 20 | 10 | 10 | 10 | 10 | 45 |
| 4 Na—AA | 1 | 80 | 40 | 20 | 10 | 10 | 40 | 780 |

Table VIII indicates the effectiveness of the invention under dynamic temperatures and pressure. At 400° F., no viscosity hump was observed as in the Na—AA or AA—AMD polymers.

TABLE IX

Copolymer Dispersant Data
1 ppb Dispersant (by activity) in 12 ppg Fresh Water Mud Containing 15 ppb Calcium Bentonite as a Solid Contaminant

| Copolymer | Dispersant Ratio (% by wt) | Neutralizing Agent | Fann 35 Viscosity Reading at RPM | | | | | | | | PV | YP |
|---|---|---|---|---|---|---|---|---|---|---|---|---|
| | | | 600 | 300 | 200 | 100 | 6 | 3 | 10 sec | 10 min | | |
| AA—MA | 93-7 | TIPA | 68 | 37 | 27 | 15 | 1 | 1 | 1 | 1 | 31 | 6 |
| AA—MA | 85-15 | TEA | 76 | 42 | 31 | 17 | 2 | 1 | 1 | 2 | 34 | 8 |
| AA—MA | 93-7 | TEA | 79 | 44 | 32 | 18 | 3 | 2 | 2 | 2 | 35 | 9 |
| AA—MA | 93-7 | NaOH | 90 | 51 | 37 | 21 | 2 | 1 | 2 | 3 | 39 | 12 |
| AA—MA | 85-15 | NaOH | 155 | 95 | 71 | 43 | 6 | 4 | 5 | 6 | 60 | 35 |
| Hot Rolled at 150° for 16 Hours | | | | | | | | | | | | |
| AA—MA | 93-7 | TIPA | 108 | 62 | 45 | 27 | 3 | 2 | 2 | 3 | 46 | 16 |
| AA—MA | 85-15 | TEA | 125 | 74 | 54 | 32 | 3 | 2 | 3 | 3 | 51 | 23 |
| AA—MA | 93-7 | TEA | 130 | 77 | 57 | 34 | 4 | 3 | 3 | 3 | 53 | 24 |
| AA—MA | 93-7 | NaOH | 139 | 82 | 60 | 35 | 4 | 3 | 4 | 4 | 57 | 25 |
| AA—MA | 85-15 | NaOH | 255 | 168 | 131 | 84 | 13 | 9 | 9 | 10 | 87 | 81 |

Table IX illustrates the dispersing effects contributed by alkanolamine salts of copolymers.

TABLE X

Solids Contaminating Resistance of 12 ppg Fresh Water Mud Containing Indicated Concentration of Dispersant

| Dispersant | ppb by Activity | EX* | 600 | 300 | Gel Strength | | Bingham Plastic | | pH | Power Law | |
|---|---|---|---|---|---|---|---|---|---|---|---|
| | | | | | 10 Sec | 10 Min | PV | YP | | n | K |
| — | 0 | 0 | 62 | 42 | 12 | 39 | 20 | 22 | 8.2 | 0.56 | 0.0135 |
| — | 0 | 1 | 72 | 49 | 19 | 42 | 23 | 26 | 8.1 | 0.55 | 0.0164 |
| — | 0 | 2 | 94 | 65 | 35 | 36 | 29 | 36 | 7.9 | 0.53 | 0.0251 |
| — | 0 | 3 | 123 | 89 | 47 | 78 | 34 | 55 | 8.0 | 0.47 | 0.0517 |
| — | 0 | 4 | 151 | 104 | 63 | 87 | 47 | 57 | 8.0 | 0.54 | 0.0388 |
| — | 0 | 5 | 196 | 139 | 79 | 135 | 57 | 82 | 7.9 | 0.50 | 0.0674 |
| TEA—AA | 2.50 | 1 | 53 | 27 | 3 | 4 | 26 | 1 | 9.5 | 0.97 | 0.0007 |
| TEA—AA | 2.50 | 2 | 65 | 35 | 3 | 4 | 30 | 5 | 9.7 | 0.89 | 0.0014 |
| TEA—AA | 2.50 | 3 | 74 | 41 | 3 | 4 | 33 | 8 | 9.5 | 0.85 | 0.0022 |
| TEA—AA | 2.50 | 4 | 90 | 50 | 3 | 4 | 40 | 10 | 9.7 | 0.85 | 0.0027 |
| TEA—AA | 2.50 | 5 | 108 | 61 | 4 | 5 | 47 | 14 | 9.7 | 0.82 | 0.0038 |
| TEA—AA | 2.50 | 5H | 143 | 84 | 4 | 5 | 59 | 25 | 9.0 | 0.77 | 0.0075 |
| Na—AA | 2.50 | 1 | 85 | 51 | 8 | 10 | 34 | 17 | 9.5 | 0.74 | 0.0055 |
| Na—AA | 2.50 | 2 | 118 | 73 | 11 | 13 | 45 | 28 | 9.7 | 0.69 | 0.0104 |
| Na—AA | 2.50 | 3 | 161 | 102 | 13 | 18 | 59 | 43 | 9.6 | 0.66 | 0.0179 |
| Na—AA | 2.50 | 4 | 211 | 137 | 16 | 31 | 74 | 63 | 9.6 | 0.62 | 0.0301 |
| Na—AA | 2.50 | 5 | 217 | 142 | 17 | 32 | 75 | 67 | 9.9 | 0.61 | 0.0334 |
| Na—AA | 2.50 | 5H | 297 | 201 | 23 | 30 | 96 | 105 | 9.2 | 0.56 | 0.0640 |
| Na—AA | 1.00 | 0 | 56 | 29 | 1 | 1 | 27 | 2 | 10.0 | 0.95 | 0.0008 |
| TEA—AA | 1.00 | 0 | 50 | 26 | 1 | 1 | 24 | 2 | 10.0 | 0.94 | 0.0008 |
| Na—AMD—AMPS | 1.00 | 0 | 80 | 47 | 4 | 4 | 33 | 14 | 10.0 | 0.77 | 0.0042 |
| TEA—AA | 1.00 | 2.5 | 85 | 48 | 2 | 2 | 37 | 11 | 10.5 | 0.82 | 0.0030 |
| Na—AA | 1.00 | 2.5 | 105 | 60 | 2 | 2 | 45 | 15 | 10.8 | 0.81 | 0.0042 |
| Na—AMD—AMPS | 1.00 | 2.5 | 150 | 95 | 7 | 12 | 55 | 40 | 10.3 | 0.66 | 0.0167 |
| TEA—AA | 1.00 | 5 | 141 | 84 | 2 | 3 | 57 | 27 | 10.0 | 0.75 | 0.0085 |
| Na—AA | 1.00 | 5 | 204 | 127 | 5 | 7 | 77 | 50 | 10.5 | 0.68 | 0.0191 |
| Na—AMD—AMPS | 1.00 | 5 | 270 | 83 | 16 | 30 | 87 | 96 | 10.0 | 0.56 | 0.0591 |
| TEA—AA | 1.00 | 5H | 212 | 134 | 5 | 7 | 78 | 56 | 9.3 | 0.66 | 0.0231 |
| Na—AA | 1.00 | 5H | 291 | 189 | 9 | 11 | 102 | 87 | 9.9 | 0.62 | 0.0416 |
| Na—AMD—AMPS | 1.00 | 5H | 300 | 250 | 24 | 31 | 50 | 200 | 9.5 | 0.26 | 0.5173 |

*REV Dust·Contamination for each example:
Ex 1 = 10 ppb 2 = 20 ppb 2.5 = 25 ppb 3 = 30 ppb 4 = 40 ppb 5H = 50 ppb Hot Rolled 5 = 50 ppb
Note: Na refers to the sodium salt of the polymer.

Table X dramatically illustrates the superior solids contamination resistance of the invention. With increasing amounts of solids contamination (or REV dust) a laboratory prepared drilling fluid showed relatively little adverse rheological behavior (increasing YP) as compared with other polymers.

While the invention has been described with reference to certain specific embodiments thereof it is understood that it is not to be so limited since alterations and changes may be made therein which are within the full intended scope of the appended claims.

What is claimed is:

1. A composition comprising a salt of a polymer of acrylic or methacrylic acid having at least 50% by weight of acrylic or methacrylic acid with mixtures of lithium and alkanolamine, said alkanolamine containing from 2 to 12 carbon atoms, the polymer having a weight average molecular weight of between about 2,000 to about 15,000 and a pH of between about 6 to about 8.5, the amount of lithium being present to give from about 30% to about 70% of the desired neutralization of said polymer and the alkanolamine being present to give from about 70% to about 30% of the desired neutralization of said polymer.

2. The composition of claim 1 wherein the salt is a mixture of lithium and triethanolamine.

* * * * *